United States Patent [19]
Heegard

[11] Patent Number: 5,621,761
[45] Date of Patent: Apr. 15, 1997

[54] ROTATIONALLY INVARIANT TRELLIS CODING INCORPORATING TRANSPARENT BINARY CONVOLUTIONAL CODES

[75] Inventor: Chris Heegard, Ithaca, N.Y.

[73] Assignee: General Instrument Corporation of Delaware, Chicago, Ill.

[21] Appl. No.: 353,064

[22] Filed: Dec. 9, 1994

[51] Int. Cl.⁶ .............................. H04L 5/12; H04L 23/02
[52] U.S. Cl. .......................... 375/265; 375/262; 375/341; 371/43; 341/51; 341/106
[58] Field of Search ................................... 375/262, 265, 375/341; 371/43; 341/51, 106

[56] References Cited

U.S. PATENT DOCUMENTS

| | | | |
|---|---|---|---|
| 5,233,629 | 8/1993 | Paik et al. | 375/265 |
| 5,321,725 | 6/1994 | Paik et al. | 375/265 |
| 5,396,518 | 3/1995 | How | 375/265 |
| 5,535,228 | 7/1996 | Dong et al. | 375/265 |

Primary Examiner—Stephen Chin
Assistant Examiner—Don Vo
Attorney, Agent, or Firm—Barry R. Lipsitz; Ralph F. Hoppin

[57] ABSTRACT

A rotationally invariant trellis coder is provided for encoding data to be transmitted using a two-dimensional symbol modulation. A precoder, provided at the transmitter, processes data such that a counterpart postcoder at the receiver will provide an output that is invariant to any multiple of a 90° rotation. An encoder encodes the precoded data using a transparent binary convolutional code, which can be a punctured or unpunctured code. The encoded data is mapped to a two-dimensional signal space having a plurality of signal points. The signal points are labeled with unique binary codes in which the two least significant bits, denoted by $(I_j, Q_j)$, are permuted and partially complemented to $(\bar{Q}_j, I_j)$ for each 90° phase rotation around the signal space. The remaining most significant bits for each point, if any, are invariant to such rotation. The postcoder provided at the receiver inverts the precoder and is feedback-free, thus limiting error propagation.

27 Claims, 6 Drawing Sheets

ROTATIONALLY INVARIANT TRELLIS CODING INCORPORATING TRANSPARENT BINARY CONVOLUTIONAL CODES

BACKGROUND OF THE INVENTION

The present invention relates to the communication of digital data using trellis coded modulation, and more particularly to a method and apparatus for incorporating a rotationally invariant trellis encoding/decoding scheme into a quadrature phase shift keyed (QPSK) or quadrature amplitude modulation (QAM) transmission system. One of the various applications for which the present invention is particularly well suited is in the transmission of digital television signals.

Digital data, for example, digitized, compressed television (NTSC) or high-definition television (HDTV) signals can be transmitted over terrestrial very high frequency (VHF), ultra-high-frequency (UHF), satellite channels or cable television analog channels to end users. In order to communicate digital data via an analog channel, the data is modulated using, for example, a form of pulse amplitude modulation (PAM). Typically, quadrature amplitude modulation (QAM) or single-sideband (SSB) modulation is chosen to efficiently use the available channel bandwidth. QAM is a quadrature, or orthogonal combination of two PAM signals. When viewed as coordinates of a plane, the combined PAM signals form a signal space or "constellation" of possible transmission levels. Each transmitted constellation point is called a symbol. For example, two independent, quadrature four-level AM signals form a 16-QAM constellation which encodes four bits. A 32-point constellation can be formed with dependent six-level AM quadrature signals, encoding five bits per symbol. In systems that have a lower carrier-to-noise ratio (CNR) than can be tolerated by QAM, lower modulation orders are useful, such as QPSK having a four-point constellation.

In pulse amplitude modulation, each signal is a pulse whose amplitude level is selected from a fixed set of levels. In 16-QAM, each of the quadrature PAM signals select from uniformly spaced, bipolar amplitudes scaled from amplitude levels $-3, -1, 1, 3$. Spectral efficiency in digital communication systems is defined as the number of transmitted information bits per second per unit of bandwidth, i.e., the ratio of the data rate to the bandwidth. Modulation systems with very high bandwidth efficiency are employed in applications that require high data throughput with small available bandwidth. QAM and SSB provide bandwidth efficient modulation, which can provide very low bit error rates when used with high efficiency forward error correction codes such as trellis coded modulation (TCM).

Trellis coded modulation has evolved as a combined coding and modulation technique for digital transmission over bandlimited channels. Unlike the traditional application of convolutional codes to two-level PAM, which increases the bandwidth used in transmission, TCM increases the constellation size instead. In TCM schemes, a sequence of "coded" bits are convolutionally encoded into a sequence of groups which partition the symbol constellation. For each encoded group of a QAM constellation, a number of "uncoded" bits are transmitted by selecting a unique constellation element of the group. Most TCM schemes map one step of the convolutional code trellis to one transmission symbol which consists of two QAM components (I, Q). Such two-dimensional (2-D) codes achieve a throughput of an integer number of information bits per 2-D symbol.

At a receiver, the sequence of transmitted groups is decoded by a soft-decision maximum likelihood (ML) convolutional code decoder. Such TCM schemes can improve the robustness of digital transmission against additive noise by three to six dB or more, compared to uncoded modulation at the same information rate. One widely used technique for efficient ML decoding of convolutional codes is the Viterbi algorithm disclosed in A. J. Viterbi and J. K. Omura, *Principles of Digital Communications and Coding*, New York, N.Y., McGraw Hill 1979. It is known that decoding of high-rate R convolutional codes can be simplified by using "punctured" codes, which are obtained by periodically deleting some of the output bits of a lower rate code. A rate 1/n code can be punctured to a rate m/k and can be easily decoded with simple modifications to a rate 1/n decoder. An example of such a decoder is provided in commonly assigned, copending U.S. patent application Ser. No. 08/054,642 filed on May 5, 1993 for "Apparatus and Method for Communicating Digital Data Using Trellis Coding with Punctured Convolutional Codes."

Fast recovery from phase ambiguities is very important for robust modem design. Of all the tracking loops in a typical receiver, such as the automatic gain control, adaptive equalizer, and carrier timing loop, the carrier recovery loop is often the most fragile, resulting in noise. Phase ambiguities can cause a carrier timing slip, requiring a major resynchronization of the forward error correction (FEC), leading to a burst of errors at the FEC output. The Viterbi algorithm (or other sequence estimator used) must detect the event and restart the decoding. Therefore, it would be desirable to provide a coding method that quickly recovers from a phase rotation without causing the FEC to change state. Such a coding method would be particularly useful in the design of a receiver that can cancel large amounts of phase noise introduced in the mixing process.

To robustly track phase jitter, the carrier timing loop bandwidth is typically opened, causing the signal-to-noise ratio (SNR) in the loop to degrade. This leads to exposure to phase flips, limiting the ability of the receiver to handle phase noise. Quick recovery from carrier timing loop slips enables a more aggressive phase noise cancellation to be implemented without the risk of a large error burst appearing at the output of the FEC.

One problem that has been encountered with multilevel modulation techniques, particularly when used with trellis coding, is that 90° phase ambiguities may occur in the signal received from a communication channel. Such phase ambiguities make it difficult to determine the absolute phase of the symbol that has been received. Decoding errors will occur when incorrect assumptions are made as to whether one point or another point in the same group, but offset by 90°, has been received.

It would be advantageous to provide a rotationally invariant trellis encoding/decoding scheme for use in a QPSK or QAM transmission system or the like. Such a scheme should resolve all multiples of 90° phase ambiguities. Quick recovery from phase flip in a receiver should be provided. Any propagation of errors should be insignificant, and coding gain should not be adversely affected.

The present invention provides a rotationally invariant trellis encoding/decoding scheme enjoying the aforementioned advantages.

SUMMARY OF THE INVENTION

In accordance with the present invention, a rotationally invariant trellis coder is provided for encoding input data to be transmitted to a receiver using a two-dimensional symbol modulation. A precoder is provided for processing said input data. The precoder comprises nonlinear logic that is the inverse of logic provided by a counterpart postcoder at said receiver. An encoder encodes the precoded data using a transparent binary convolutional code, which can be a punctured code. Means are provided for mapping the encoded data from the encoder to a two-dimensional signal space having a plurality of signal points. The signal points are labeled with unique binary codes in which the two least significant bits, denoted by (I, Q), are permuted and partially complemented to ($\overline{Q}$, I) for each 90° phase rotation around the signal space. The remaining most significant bits for each point, if any, are invariant to such rotation.

In an illustrated embodiment, the precoder converts a first input data stream $w_j$ and a second input data stream $z_j$ data to corresponding precoded data streams $x_j$ and $y_j$, respectively, using feedback of delayed data $x_{j-1}$ and $y_{j-1}$ in accordance with the relationships:

$$x_j = w_j \oplus x_{j-1} \oplus z_j \odot (x_{j-1} \oplus y_{j-1}),$$

and $$y_j = z_j \oplus w_j \oplus y_{j-1} \oplus z_j \odot (x_{j-1} \oplus y_{j-1}).$$

The $x_j$ and $y_j$ data streams output from the precoder are convolutionally encoded to provide the two least significant bits of symbols that are mapped to the signal points in the signal space. In a QAM embodiment, as opposed to a QPSK embodiment, uncoded bits are provided in addition to the coded bits. Means are provided for parsing the uncoded bits from the input data for use by the mapping means. The uncoded bits represent the most significant bits of the symbols that are mapped to the signal points in the signal space.

A decoder is provided for use in decoding symbols output from the trellis coder. At least one sequence estimator, such as a Viterbi algorithm, is used to recover the precoded data from a received data stream. A postcoder is provided for receiving and processing the recovered precoded data to provide output data that is invariant to 90° rotations of the recovered precoded data.

In order to accommodate QAM data, means can be provided in the decoder for pruning the received data stream to recover coded and uncoded bits therefrom. The coded bits are input to the sequence estimator. Means are provided for selecting uncoded in-phase (I) data or uncoded quadrature phase (Q) data for combination with the postcoded data from the postcoder. The precoded data recovered by the sequence estimator is reencoded for use in actuating the selecting means to select the uncoded I data or the uncoded Q data.

Where the precoder converts a first input data stream $w_j$ and a second input data stream $z_j$ to corresponding precoded data streams $x_j$ and $y_j$, respectively, as set forth above, the postcoder will convert the precoded data recovered from the data streams, namely $x_j'$ and $y_j'$, respectively, to a first output data stream $w_j'$ and a second output data stream $z_j'$ in accordance with the relationships:

$$w_j' = x_j' \oplus y_{j-1}' \oplus (x_j' \oplus y_j') \odot (x_{j-1}' \oplus y_{j-1}'),$$

and $$z_j' = y_j' \oplus x_j' \oplus y_{j-1}' \oplus x_{j-1}'.$$

The invention also provides a precoder for use in a rotationally invariant trellis coder. A first path of the precoder has a plurality of exclusive OR gates for converting a first input data stream $w_j$ to corresponding precoded data $x_j$. A second path has a plurality of exclusive OR gates for converting a second input data stream $z_j$ to corresponding precoded data $y_j$. A first feedback path is coupled to obtain the precoded data $x_j$ from the first path. The first feedback path includes delay means for providing previous data $x_{j-1}$. A second feedback path is coupled to obtain the precoded data $y_j$ from the second path. The second feedback path includes delay means for providing previous data $y_{j-1}$. The first and second feedback paths have at least one common exclusive OR gate and at least one common AND gate. The precoder converts the first and second input data streams to the precoded data in accordance with the relationships:

$$x_j = w_j \oplus x_{j-1} \oplus z_j \odot (x_{j-1} \oplus y_{j-1}),$$

and $$y_j = z_j \oplus w_j \oplus y_{j-1} \oplus z_j \odot (x_{j-1} \oplus y_{j-1}).$$

A postcoder for use in a rotationally invariant trellis decoder is also provided. The postcoder includes a first path having a plurality of exclusive OR gates for providing an output data stream $w_j'$ from a received precoded data stream $x_j'$ recovered using a sequence estimation algorithm, such as a Viterbi algorithm. A second path has a plurality of exclusive OR gates for providing an output data stream $z_j'$ from a received precoded data stream $y_j'$ recovered using the sequence estimation algorithm. An AND gate has a first input coupled to receive the exclusive OR of the precoded data streams $x_j'$ and $y_j'$ from the first and second paths, respectively. A second input of the AND gate is coupled to receive the exclusive OR of delayed data streams $x_{j-1}'$ and $y_{j-1}'$ from the first and second paths, respectively. The AND gate has an output coupled to an input of one of the exclusive OR gates in the first path. The postcoder produces the output data streams $w_j'$ and $z_j'$ from the precoded data streams $x_j'$ and $y_j'$ in accordance with the relationships:

$$w_j' = x_j' \oplus y_{j-1}' \oplus (x_j' \oplus y_j') \odot (x_{j-1}' \oplus y_{j-1}'),$$

and $$z_j' = y_j' \oplus x_j' \oplus y_{j-1}' \oplus x_{j-1}'.$$

A method is provided for coding digital data to enable rotationally invariant trellis coded modulation thereof. A stream of bits to be coded is first precoded to render them rotationally invariant when encoded with a transparent binary convolutional code and subsequently decoded and postcoded at a receiver. The precoded bits are encoded using the transparent binary convolutional code to provide coded information. The coded information is mapped to a two-dimensional signal space having a plurality of signal points. The signal points are labeled with unique binary codes in which the two least significant bits, denoted by (I, Q), are permuted and partially complemented to ($\overline{Q}$, I) for each 90° phase rotation around the signal space. The remaining most significant bits for each point, if any, are invariant to such rotation.

The coded information provided by the method of the invention can be representative of in-phase (I) and quadrature phase (Q) data. The I and Q data are transmitted over a communication channel in accordance with the signal space mapping. The I and Q data are received from the communication channel and demodulated. The coded information for the I and Q data is decoded to recover the precoded bits. The recovered precoded bits are postcoded to reverse the effect of the precoding step in order to recover the stream of bits.

When the method is used for QAM transmission, the data is parsed prior to the precoding step into a stream of uncoded bits and the stream of bits to be coded. The uncoded bits are mapped to the most significant bits of signal points in the signal space. The coded information derived from the stream of bits to be coded is mapped to the least significant bits of the signal points. The uncoded bits and coded information can represent in-phase and quadrature phase data. The I and Q data are transmitted over a communication channel in accordance with the signal space mapping. The I and Q data are received from the communication channel and demodulated. The demodulated I data is pruned to recover corresponding uncoded bits and coded information. The demodulated Q data is also pruned to recover corresponding uncoded bits and coded information. The pruned coded information for the I and Q data is decoded to recover the precoded bits. The recovered precoded bits are postcoded to recover the stream of bits that was coded at the encoder. The recovered precoded bits are reencoded using the transparent binary convolutional code to provide control signals. Uncoded bits pruned from the I data or from the Q data are selected in response to the control signals for combination with the stream of bits recovered by the postcoding step in order to reconstruct the digital data.

DETAILED DESCRIPTION OF THE INVENTION

The present invention provides a method and apparatus for incorporating a rotationally invariant trellis encoding scheme into a two-dimensional symbol (e.g., QPSK or QAM) transmission system subject to a 90° phase ambiguity. The method of coding involves the use of a transparent binary convolutional code and a two-dimensional signal space mapping in conjunction with a precoding and postcoding function. The method is compatible with any transparent binary convolutional code, including punctured codes. An example of such a code is the 64-state code described in J. A. Heller and I. M. Jacobs, "Viterbi Decoding for Satellite and Space Communication," *IEEE Trans. Commun. Technol.*, COM-19, pp. 835–848, October 1971.

Rotationally invariant (RI) trellis codes with RI encoders/uncoders are highly desirable as a method of handling 90° phase ambiguities in transmission systems such as QPSK and QAM. The coding method of the present invention utilizes a transparent binary convolutional code. A binary convolutional code (BCC) is said to be transparent if the complement of any codeword is always a codeword. Since BCCs are linear codes, a BCC is transparent if and only if the "all 1's" sequence is a codeword. For an (n, k) BCC described by a generator matrix G(D) (a k×n polynomial matrix of rank k) and a parity check matrix H(D) (a n–(k×n) polynomial matrix of rank n–k, $G(D)H(D)^t=0$), the code is transparent if and only if the sum of the columns of H(D) is divisible by 1–D.

A rotationally invariant code always has a rotationally invariant encoder/uncoder. Such an encoder/uncoder has the property that the output of the uncoder for any codeword is the same as the output when the codeword is first rotated by 0°, 90°, 180° or 270° before being presented to the uncoder. In other words, a codeword and rotated version thereof produce the same output at the uncoder. Such an uncoder is required to be feedback-free as, for example, in a finite impulse response (FIR) filter, to ensure finite error propagation at the receiver, while the encoder has feedback as, for example, in an infinite impulse response (IIR) filter.

The transparent binary convolutional code is mapped to a two-dimensional signal space which is uniquely labeled. In particular, counterpart symbols in successive symbol groups are labeled with least significant bits (I, Q) such that under counterclockwise 90° rotation, the LSBs will be permuted and partially complemented to ($\bar{Q}$, I). For a QPSK constellation, if the two bits labeling the four points are denoted by ($I_j$, $Q_j$), then $$(I_j,Q_j) \to (\bar{Q}_j,I_j) \to (\bar{I}_j,\bar{Q}_j) \to (Q_j,\bar{I}_j) \to (I_j,Q_j).$$

The key to this mapping is that under 90° rotation, $$(I_j,Q_j) \to (\bar{Q}_j,I_j)$$

Figure 1:
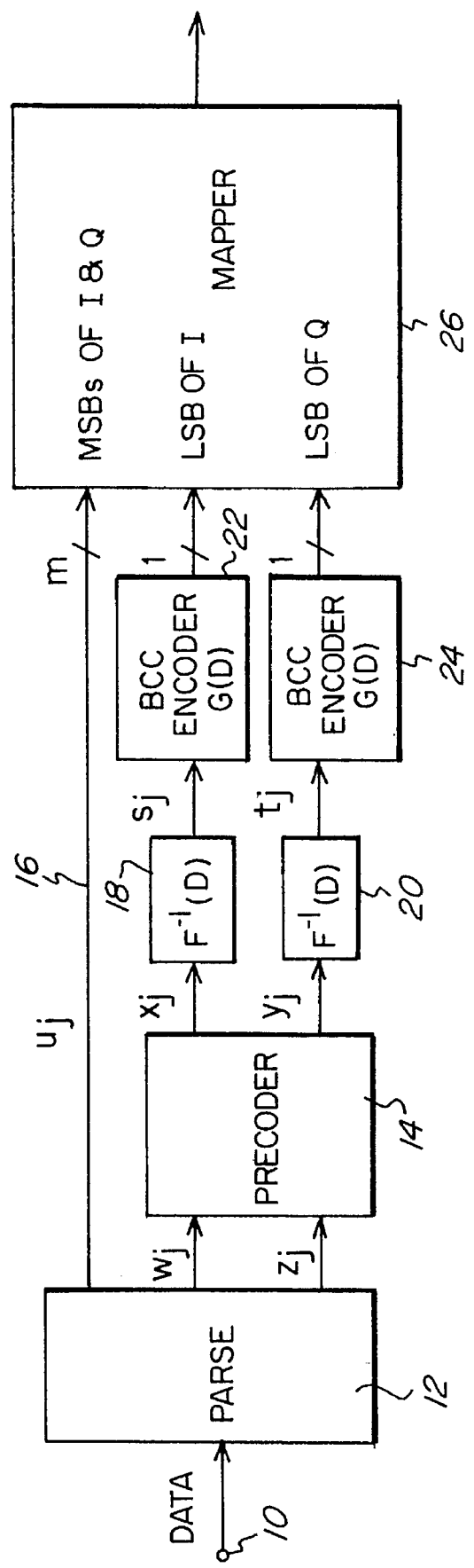
FIG. 1 is a block diagram of a rotationally invariant encoder in accordance with the present invention.

FIG. 1 illustrates an encoder in accordance with the present invention. Serial data to be encoded is input via terminal 10 to a parser 12, which in the case of modulation levels higher than QPSK (e.g., QAM) parses the data into uncoded bits $u_j$ output on path 16 to mapper 26 and a first data stream ($w_j$) as well as a second data stream ($z_j$) that are input to a precoder 14. The precoder 14 precodes the data streams ($w_j$, $z_j$) to render the data represented thereby rotationally invariant at a receiver when properly encoded and mapped at the encoder and decoded and postcoded at the receiver. The precoded data output from precoder 14 ($x_j$, $y_j$) is input to optional feedback matrices 18, 20, respectively. The two binary outputs of the precoder are independently encoded with separate binary convolutional encoders 22, 24. The BCC outputs, along with the remaining uncoded information $u_j$ on line 16 are combined to select the QAM constellation point to be transmitted. It should be appreciated that in a QPSK implementation, there are no uncoded bits and line 16 is not necessary.

The mapping of the BCC outputs is such that they independently select the least significant bit (LSB) of the "I" and "Q" coordinates. In addition, the uncoded or "parallel edge" information $u_j$ is rotationally invariant.

The encoding of the transparent code described by the polynomial generator matrix G(D) is accomplished by the optional feedback matrix $F^{-1}$(D) followed by the feedforward generator G(D). This structure allows for various encoders for the selected code. For example, a "systematic"

encoder is possible. The only requirement on the encoder matrices is that if the input to G(D) (or F$^{-1}$ (D)) is complemented such that zeros become ones, and vice versa, then the output is complemented. This is always possible for a transparent BCC.

The precoder 14 has a structure that results in rotational invariance when combined with a transparent BCC and the aforementioned rotationally invariant labeling of the signal set (described in greater detail below in connection with FIGS. 4–6). In the preferred embodiment, the precoder converts the $w_j$ and $z_j$ data to corresponding precoded data $x_j$ and $y_j$, respectively, using feedback of delayed data $x_{j-1}$ and $y_{j-1}$ in accordance with the relationships:

$$x_j = w_j \oplus x_{j-1} \oplus z_j \odot (x_{j-1} \oplus y_{j-1}),$$

and $$y_j = z_j \oplus w_j \oplus y_{j-1} \oplus z_j \odot (x_{j-1} \oplus y_{j-1});$$

in which the symbol $\oplus$ represents an exclusive OR operation and the symbol $\odot$ represents an AND operation.

A counterpart postcoder is necessary at the decoder, described in greater detail below in connection with FIG. 7. The postcoder converts the precoded data $x_j'$ and $y_j'$ recovered from a communication channel to respective $w_j'$ and $z_j'$ data in accordance with the relationships:

$$w_j' = x_j' \oplus y_{j-1}' \oplus (x_j' \oplus y_j') \odot (x_{j-1}' \oplus y_{j-1}'),$$

and $$z_j' = y_j' \oplus x_j' \oplus y_{j-1}' \oplus x_{j-1}'.$$

The $x_j$, $y_j$, $w_j$ and $z_j$ terms are primed in the postcoder equations merely to represent that they may be nonidentical to the corresponding terms at the precoder, due to (1) errors introduced in the communication channel and (2) a phase discrepancy of 90°, 180° or 270° between the absolute phase of the transmitter and receiver. Ideally, however, up to the phase discrepancy, these terms would be identical at both the precoder and postcoder.

It can be seen from the above relationships that (1) the postcoder inverts the precoder, (2) the output of the postcoder is the same under the map $(x_j, y_j) \to (\bar{y}_j, x_j)$ (or any integer power of this map), and (3) the postcoder function is feedback-free (i.e., it represents a "sliding window" function of its input) and thus limits error propagation.

Figure 2:
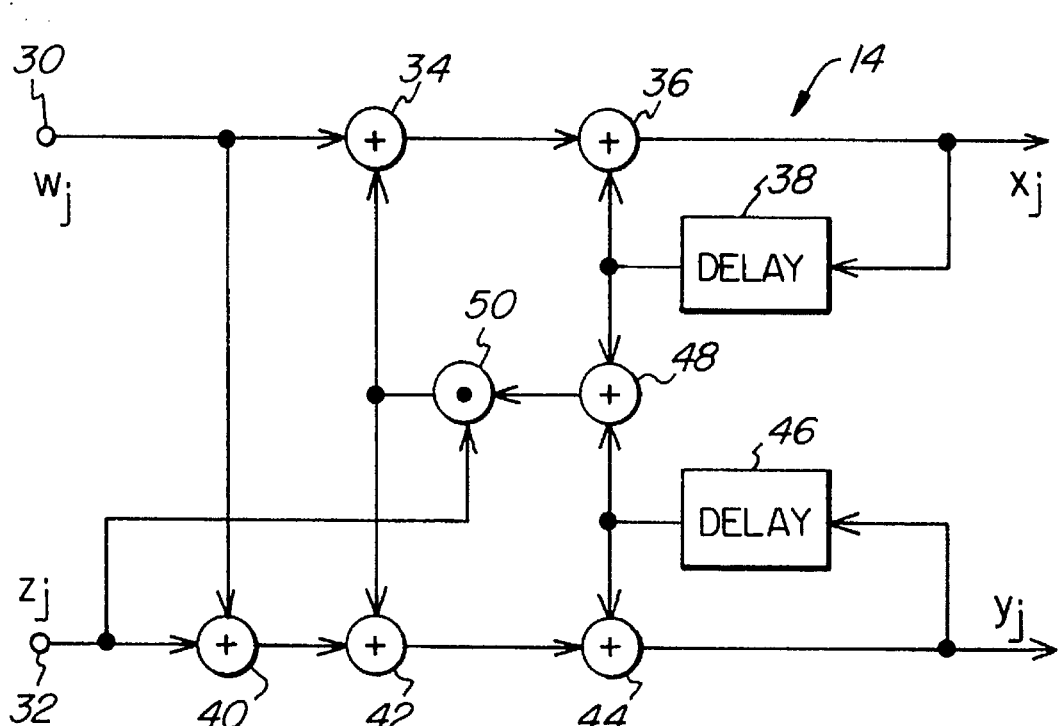
FIG. 2 is an illustrative embodiment of a precoder that can be used in the encoder of FIG. 1.

A preferred implementation of precoder 14 is illustrated in FIG. 2. The $w_j$ information is input via terminal 30 to a first path having a plurality of exclusive OR gates 34, 36. The $z_j$ information is input to a second path having a plurality of exclusive OR gates 40, 42, 44 via input terminal 32. A first feedback path is coupled to obtain the precoded data $x_j$ from the first path, and includes a delay 38 (e.g., a flip-flop) for providing previous data $x_{j-1}$. A second feedback path is coupled to obtain the precoded data $y_j$ from the second path. The second feedback path includes delay means 46 for providing previous data $y_{j-1}$. The first and second feedback paths have at least one common exclusive OR gate 48 and one common AND gate 50. Those skilled in the art will appreciate that the implementation illustrated in FIG. 2 will process the $w_j$ and $z_j$ information in accordance with the precoder relationships set forth above in order to provide the $x_j$ and $y_j$ terms which result in rotational invariance when combined with a transparent BCC and the rotationally invariant labeling of the signal set.

Figure 3:
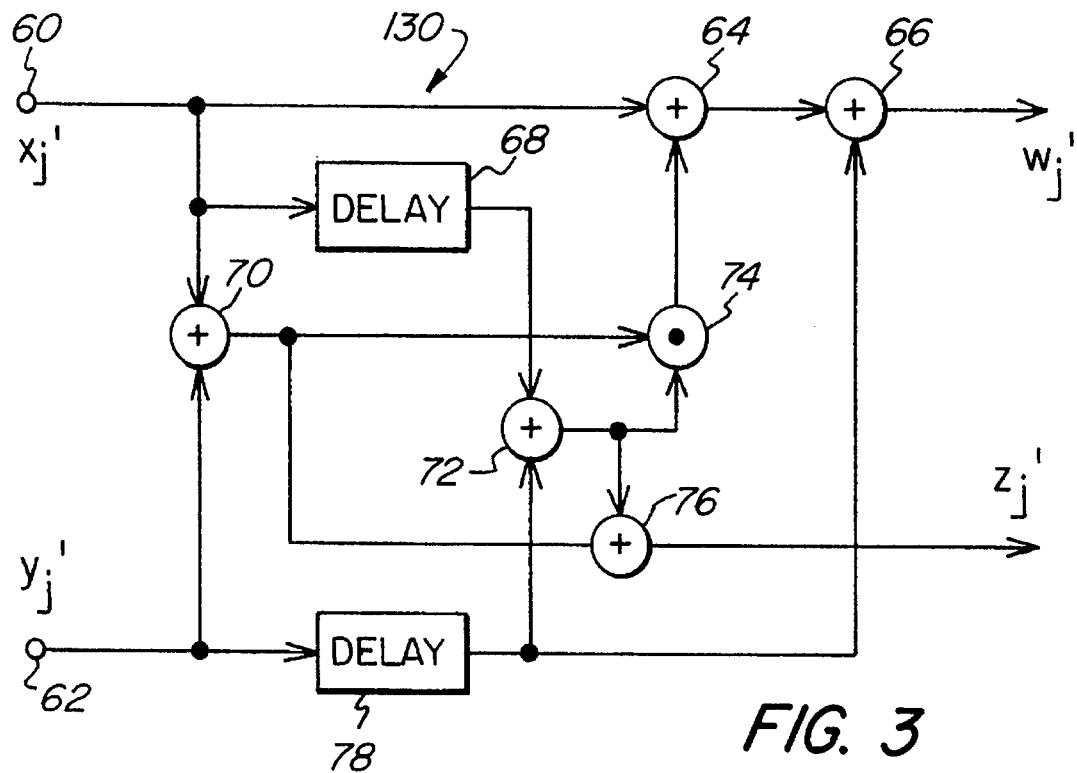
FIG. 3 is an illustrative embodiment of a postcoder that can be used in a decoder for signals received from the encoder of FIG. 1.

A preferred implementation of a postcoder 130 is illustrated in FIG. 3. The $x_j'$ term is input via terminal 60 to a first path having a plurality of exclusive OR gates 64, 66 for providing the $w_j'$ information. The $y_j'$ information is input via terminal 62 to a second path having a plurality of exclusive OR gates 70, 76 for providing the $z_j'$ information. An AND gate 74 has a first input coupled to receive the exclusive OR of the precoded data $x_j'$ and $y_j'$ from the first and second paths, respectively, via exclusive OR gate 70. AND gate 74 has a second input coupled to receive the exclusive OR of delayed signals $x_{j-1}'$ and $y_{j-1}'$ from the first and second paths, respectively, via delays (e.g., flip-flops) 68, 78 and exclusive OR gate 72. The output of AND gate 74 is coupled to an input of exclusive OR gate 64 in the first path. The postcoder 130 illustrated in FIG. 3 will therefore process the $x_j'$ and $y_j'$ data recovered from the communication channel in accordance with the postcoder relationships set forth above.

Figure 4:
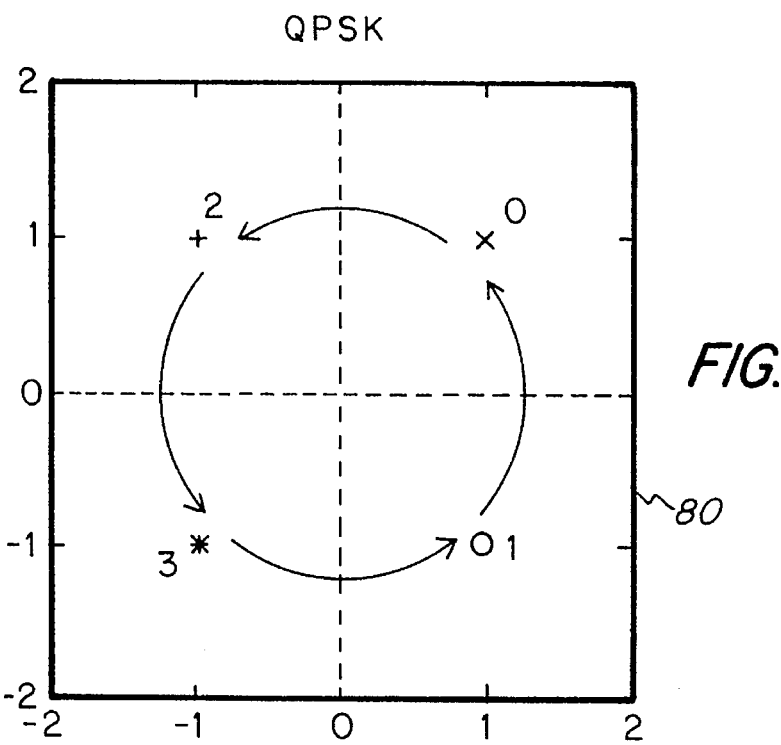
FIG. 4 is a constellation diagram for a QPSK implementation in accordance with the present invention.

FIG. 4 illustrates a rotationally invariant labeling in accordance with a QPSK implementation of the present invention. The numbers adjacent the symbol groups X, +, *, and o are octal references. The QPSK signal space 80 includes four points, each in one of the four symbol groups. The rotationally invariant labeling of the present invention is such that the least significant bits of symbol X are (0,0), of symbol + are (1,0), of symbol * are (1,1), and of symbol o are (0,1). Thus, it can be seen that under counterclockwise rotation by 90°, 180°, 270° and 360° the labels will change as follows:

$$\underset{X}{(0,0)} \to \underset{+}{(1,0)} \to \underset{*}{(1,1)} \to \underset{o}{(0,1)} \to \underset{X}{(0,0)}.$$

If the two bits labeling the four points in the QPSK signal space 80 are denoted by $(I_j, Q_j)$, then it can be seen that the following relationship is satisfied:

$$(I_j, Q_j) \to (\bar{Q}_j, I_j) \to (\bar{I}_j, \bar{Q}_j) \to (Q_j, \bar{I}_j) \to (I_j, Q_j).$$

To extend this labeling to QAM modulation, the points are labeled in such a way that (1) the two least significant bits, $(I_j, Q_j)$ satisfy $(I_j, Q_j) \to (\bar{Q}_j, I_j)$ under 90° rotation and (2) the remaining most significant bits are invariant to 90° rotation. Such a labeling exists for all 90° symmetric QAM signal sets (e.g., square and cross constellations).

Figure 5:
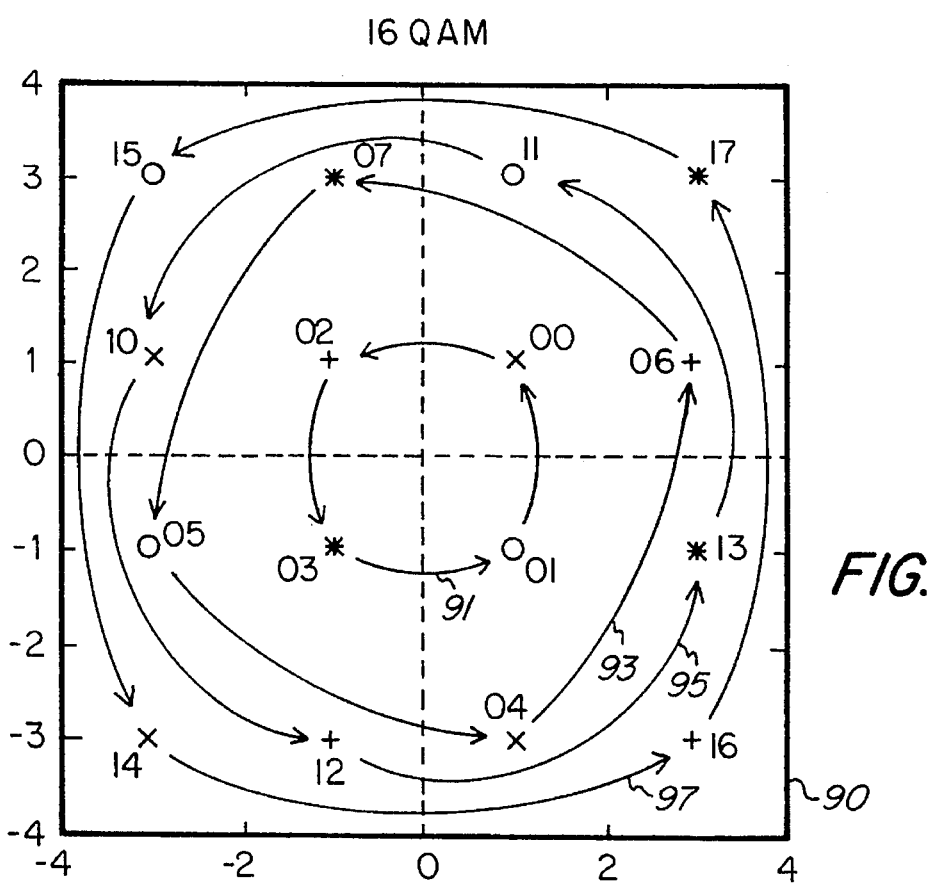
FIG. 5 is a constellation diagram for a 16-QAM embodiment in accordance with the present invention.

FIG. 5 illustrates such a labeling for a 16-QAM implementation. Again, the labeling of the symbols is indicated in octal, and complies with the labeling convention set forth above. In the 16-QAM implementation, the signal space 90 contains four modulation levels 91, 93, 95 and 97. Modulation level 93, for example, contains the four points + (labeled octal 06), * (labeled octal 07), o (labeled octal 05), and X (labeled octal 04). Octal 04 is represented in binary by the bits "0100". Octal 06 is represented by "0110". Octal 07 is "0111" and octal 05 is "0101". Any 90° counterclockwise rotation within modulation level 93 of signal space 90 will permute and complement the left one of the two least significant bits, with the two most significant bits remaining invariant. This can be seen by comparing signal point + (octal 06) to signal point * (octal 07), in which the least significant bits change from "10" to "11" complying with the relationship $(I_j, Q_j) \to (\bar{Q}_j, I_j)$. At the same time, the most significant bits "01" remain the same for each of the points + and * in modulation level 93. The labeling convention holds true for each and every point within the 16-QAM constellation illustrated in FIG. 5.

Figure 6:
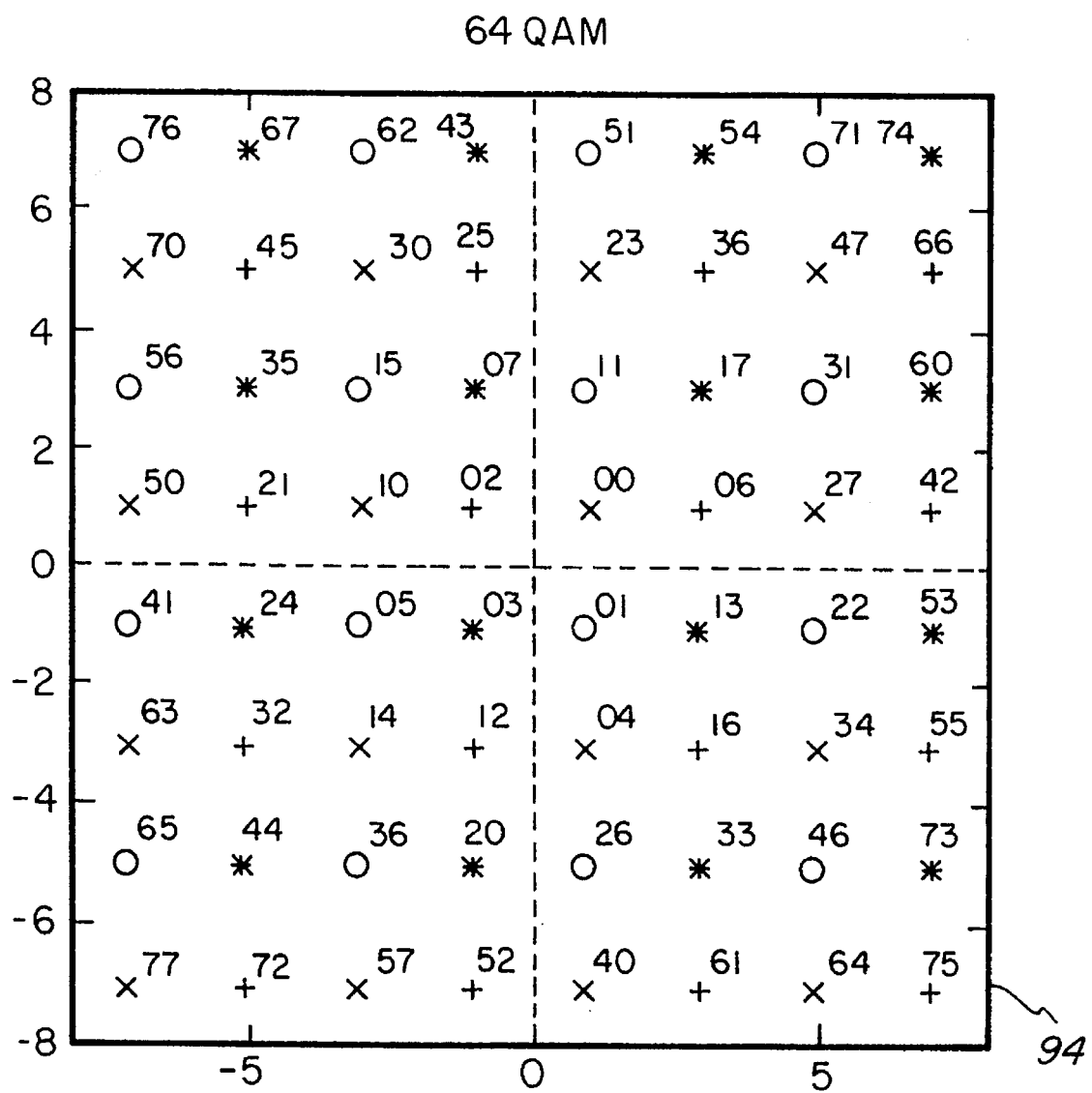
FIG. 6 is a constellation diagram for a 64-QAM embodiment in accordance with the present invention.

FIG. 6 illustrates a 64-QAM implementation. Again, the labeling convention holds for each and every point within signal space 94. As with FIGS. 4 and 5, each of the symbols in FIG. 6 is annotated with its octal representation.

The rotational invariance provided by the present invention can be easily understood by referring to the symbol labeling of FIGS. 4–6. For simplicity, it is helpful to refer to FIG. 5, where it can be seen that the counterclockwise progression from an X to a + will always represent a 90° phase shift, regardless of where the actual points appear in the signal space. If the whole signal space is shifted by 90°, 180° or 270°, the relationship between the X symbol and + symbol will still be 90°. Similarly, an * symbol will always represent a 90° shift from a +, an o will always represent a 90° shift from an *, and an X will always represent a 90° shift from an o. Rotational invariance is achieved by encoding into the phase change, and not relying on the actual phase value.

Figure 7:
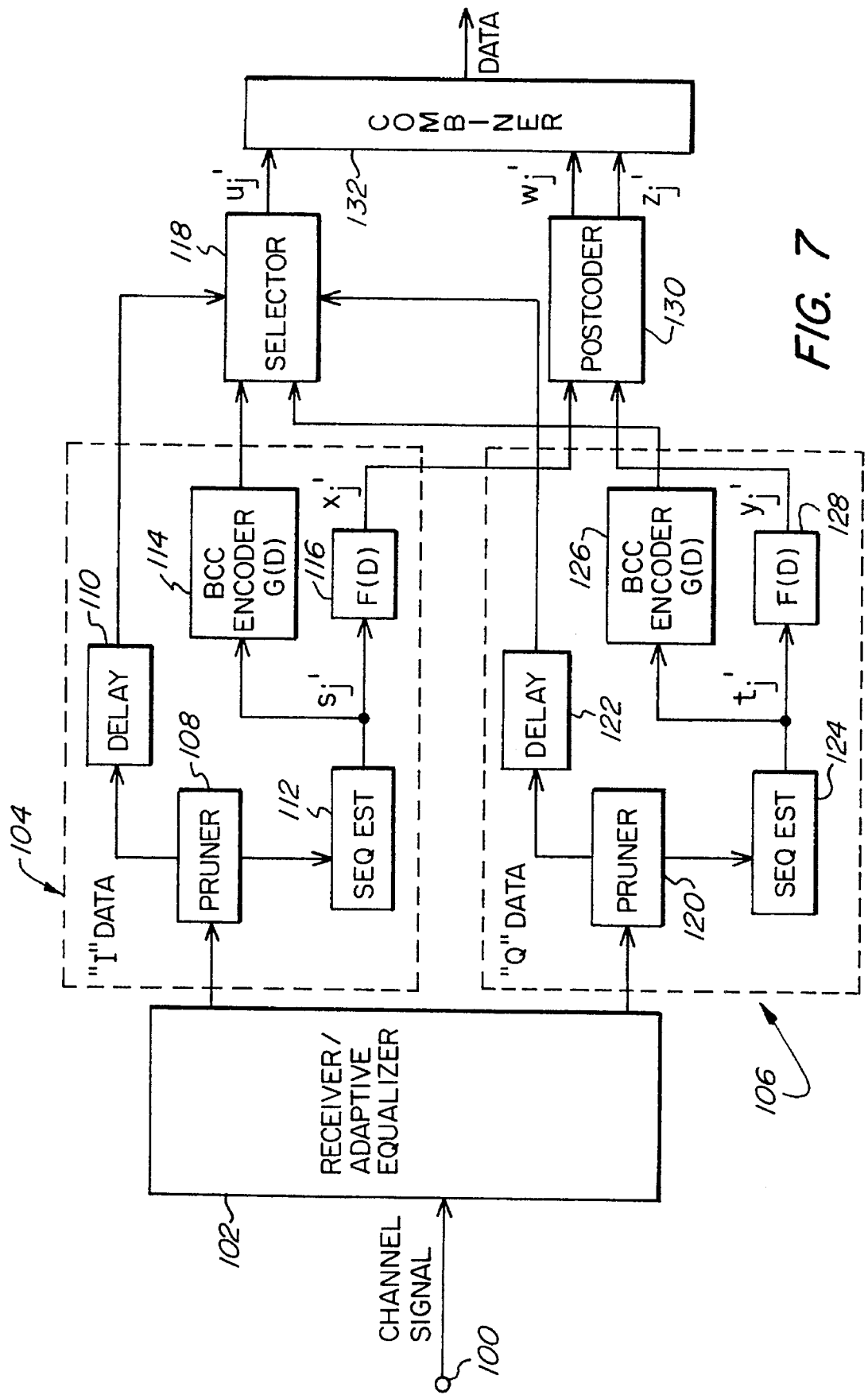
FIG. 7 is a block diagram of a decoder in accordance with the present invention.

FIG. 7 illustrates a decoder that can be used in accordance with the present invention. Data received from a transmission channel is input via terminal 100 to a conventional receiver and adaptive equalizer 102. Separate processing hardware 104, 106 is illustrated for each of the in-phase (I) and quadrature phase (Q) data, although much of the hardware could be shared in an integrated circuit implementation, as well known in the art.

The data represented as I data is pruned by a pruner 108 into uncoded bits which are delayed by a buffer (e.g., flip-flop) 110 before being input to a selector 118. The coded bits are input to a sequence estimator 112, which can comprise a standard Viterbi decoder. Algorithms other than the Viterbi algorithm, such as sequential decoding algorithms, could alternatively be used. The sequence estimator recovers the precoded bits $s_j'$ (as precoded by precoder 14 at the encoder), which are reencoded by a BCC encoder 114. The reencoded precoded bits provide control signals for actuating selector 118 to choose the appropriate uncoded bits $u_j'$ for combination with the recovered and postcoded stream of coded bits $w_j'$ and $z_j'$ in a combiner 132.

Selector 118 can comprise, for example, a multiplexer arrangement in which the two bits from the BCC encoders 114, 126 are used to select among four possible combinations of the uncoded data bits output from delay stages 110, 122. The uncoded bits are the most significant bits of the symbol, and are rotationally invariant. Once the coded bits have been identified by the sequence estimators and reencoded by the BCC encoders 114, 126, they will identify, due to the mapping used, whether the I data path or Q data path MSBs are the proper ones to select. In an alternative implementation, selector 118 could be a lookup table that is addressed by the two bits output from the BCC encoders 114, 126.

The recovered coded bits for the data designated as I data are processed by an optional feedforward matrix 116 which is the inverse of the optional feedback matrix 18 shown in FIG. 1. These bits ($X_j'$) are then postcoded in postcoder 130, which was discussed above in connection with FIG. 3.

The processing of the data designated Q data is identical to that designated I data. A pruner 120 prunes the uncoded bits, which are delayed by buffer 122 before being input to selector 118. Sequence estimator 124, BCC encoder 126, and optional feedforward matrix 128 are equivalent to elements 12, 114 and 116.

It should be noted in connection with the decoder of FIG. 7 that the decoded data will be the same regardless of any multiple of 90° rotation of the input data. The postcoder 130, the reencoders 114 and 126 and the optional feedforward matrices 116 and 128 have no feedback and thus error propagation is limited by providing, in effect, an output that is a sliding-window function of its input. In addition, error propagation of the decoded bits, as they pass through the uncoder, is typically dominated by the error propagation in the reencoder (114, 126).

Figure 8:
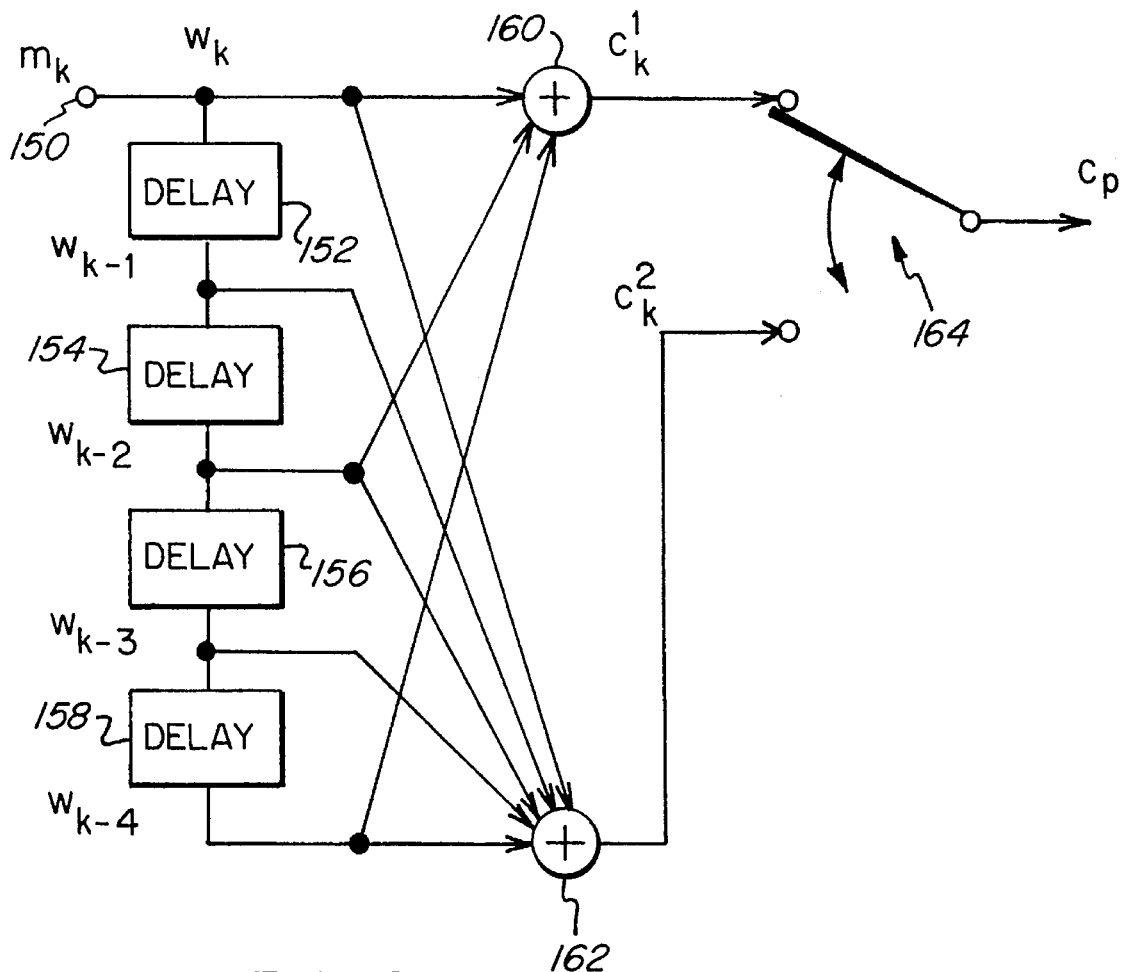
FIG. 8 is a block diagram of a binary convolutional code encoder that can be used in accordance with the present invention.

FIG. 8 illustrates an example of a BCC encoder (F(D)=1) that can be used for the encoders 22, 24, 114 and 126 illustrated in FIGS. 1 and 7. Although any transparent BCC can be used in accordance with the invention, the following punctured rate ⅘ and rate ¾ codes are provided as examples:

RATE 4/5

Punctured ½, 16-state, $D_{free} = 3$, $NN = 2$ $G_0 = (1 + D^2 + D^4, 1 + D + D^2 + D^3 + D^4)$ (Octal: 25,37)

$P = \begin{pmatrix} 1000 \\ 1111 \end{pmatrix}$ $G = \begin{pmatrix} 1+D & 1+D & 1 & 1 & 1 \\ 0 & D & 1+D & 1 & 1 \\ D & D & D & 1+D & 1 \\ 0 & D & D & D & 1+D \end{pmatrix}$ $H = (1 + D + D^2 + D^3 + D^4, 1 + D^2 + D^4,$
$D + D^3 + D^4, D + D^4, D + D^2 + D^4)$

RATE 3/4

Punctured ½, 16-state, $D_{free} = 4$, $NN = 8$ $G_0 = (1 + D^2 + D^4, 1 + D + D^2 + D^3 + D^4)$ (Octal: 25,37)

$P = \begin{pmatrix} 100 \\ 111 \end{pmatrix}$ $G = \begin{pmatrix} 1 & 1+D & 1+D & 1 \\ D & D & 1+D & 1+D \\ D^2 & D+D^2 & D & 1+D \end{pmatrix}$ $H = (1 + D + D^2 + D^3 + D^4, 1 + D^2 + D^4,$
$D + D^3 + D^4, D + D^4, D + D^2 + D^4)$ It should now be appreciated that the present invention provides rotationally invariant trellis codes for use with, e.g., QPSK and QAM transmission systems. The method of coding involves the use of a transparent binary convolutional code, a unique two-dimensional signal space mapping, together with a precoding and postcoding function which renders the postcoder output the same regardless of the phase of its input.

Although the invention has been described in connection with various preferred embodiments, it should be appreciated that numerous adaptations and modifications may be made thereto without departing from the spirit and scope of the invention as set forth in the claims.

I claim:

1. A rotationally invariant trellis coder for encoding input data to be transmitted to a receiver via a two-dimensional symbol modulation, comprising:

a precoder for processing said input data, said precoder comprising nonlinear logic that is the inverse of logic provided by a counterpart postcoder at said receiver;

an encoder for encoding the precoded data using a transparent binary convolutional code; and means for mapping the encoded data from said encoder to a two-dimensional signal space having a plurality of signal points, said points being labeled with unique binary codes in which the two least significant bits, denoted by ($I_j$, $Q_j$), are permuted and partially complemented to ($\overline{Q}_j$, $I_j$) for each 90° phase rotation around the signal space in a counter clockwise direction, the remaining most significant bits for each point, if any, being invariant to such rotation.

2. A trellis coder in accordance with claim 1 wherein said precoder converts a first input data stream $w_j$ and a second input data stream $z_j$ to corresponding precoded data streams $x_j$ and $y_j$, respectively, using feedback of delayed data $x_{j-1}$ and $y_{j-1}$ in accordance with the relationships:

$$x_j = w_j \oplus x_{j-1} \oplus z_j \odot (x_{j-1} \oplus y_{j-1}),$$

and $$y_j = z_j \oplus w_j \oplus y_{j-1} \oplus z_j \odot (x_{j-1} \oplus y_{j-1}).$$

3. A trellis coder in accordance with claim 2 wherein the $x_j$ and $y_j$ data streams output from said precoder are convolutionally encoded to provide the two least significant bits of symbols that are mapped to the signal points in said signal space.

4. A trellis coder in accordance with claim 3 further comprising:
   means for parsing uncoded bits from said input data for use by said mapping means;
   wherein said uncoded bits represent the most significant bits of said symbols that are mapped to the signal points in said signal space.

5. A decoder for use in decoding symbols output from the trellis coder of claim 1, comprising:
   at least one sequence estimator for use in recovering said precoded data from a received data stream;
   wherein said postcoder receives and processes the recovered precoded data to provide output data that is invariant to 90° rotations of the recovered precoded data.

6. A decoder in accordance with claim 5 further comprising:
   means for pruning said received data stream to recover coded and uncoded bits therefrom, said coded bits being input to said sequence estimator;
   means for selecting uncoded in-phase (I) data or uncoded quadrature phase (Q) data for combination with the output data from said postcoder; and
   means for reencoding the precoded data recovered by said sequence estimator for use in actuating said selecting means to select said uncoded I data or said uncoded Q data.

7. A decoder in accordance with claim 5 wherein:
   said precoder converts a first input data stream $w_j$ and a second input data stream $z_j$ to corresponding precoded data streams $x_j$ and $y_j$, respectively, using feedback of delayed data $x_{j-1}$ and $y_{j-1}$ in accordance with the relationships:

$$x_j = w_j \oplus x_{j-1} \oplus z_j \odot (x_{j-1} \oplus y_{j-1}),$$

and $$y_j = z_j \oplus w_j \oplus y_{j-1} \oplus z_j \odot (x_{j-1} \oplus y_{j-1}); \text{ and}$$

said postcoder converts the recovered precoded data comprising data streams $x_j'$ and $y_j'$ to first and second output data streams $w_j'$ and $z_j'$, respectively, in accordance with the relationships:

$$w_j' = x_j' \oplus y_{j-1}' \oplus (x_j' \oplus y_j') \odot (x_{j-1}' \oplus y_{j-1}'),$$

and $$z_j' = y_j' \oplus x_j' \oplus y_{j-1}' \oplus x_{j-1}'.$$

8. A decoder in accordance with claim 5, wherein said transparent binary convolutional code is a punctured code.

9. A precoder for use in a rotationally invariant trellis coder comprising:

a first path having a plurality of exclusive OR gates for converting a first input data stream $w_j$ to a corresponding precoded data stream $x_j$;

a second path having a plurality of exclusive OR gates for converting a second input data stream $z_j$ to a corresponding precoded data stream $y_j$;

a first feedback path coupled to obtain said precoded data stream $x_j$ from said first path, said first feedback path including delay means for providing previous data $x_{j-1}$;

a second feedback path coupled to obtain said precoded data stream $y_j$ from said second path, said second feedback path including delay means for providing previous data $y_{j-1}$;

said first and second feedback paths having at least one common exclusive OR gate and at least one common AND gate; and said precoder converting said first and second input data streams to said precoded data streams in accordance with the relationships:

$$x_j = w_j \oplus x_{j-1} \oplus z_j \odot (x_{j-1} \oplus y_{j-1}),$$

and $$y_j = z_j \oplus w_j \oplus y_{j-1} \oplus z_j \odot (x_{j-1} \oplus y_{j-1}).$$

10. A postcoder for use in combination with the precoder of claim 9 comprising:

a third path having a plurality of exclusive OR gates for producing an output data stream $w_j'$ from a received precoded data stream $x_j'$;

a fourth path having a plurality of exclusive OR gates for producing an output data stream $z_j'$ from a received precoded data stream $y_j'$; and an AND gate having a first input coupled to receive the exclusive OR of the precoded data streams $x_j'$ and $y_j'$ from said third and fourth paths, respectively, and a second input coupled to receive the exclusive OR of delayed data streams $x_{j-1}'$ and $y_{j-1}'$ from said third and fourth paths, respectively, said AND gate having an output coupled to an input of one of the exclusive OR gates in said third path;

said postcoder producing said output data streams $w_j'$ and $z_j'$ from said precoded data streams $x_j'$ and $y_j'$ in accordance with the relationships:

$$w_j' = x_j' \oplus y_{j-1}' \oplus (x_j' \oplus y_j') \odot (x_{j-1}' \oplus y_{j-1}'),$$

and $$z_j' = y_j' \oplus x_j' \oplus y_{j-1}' \oplus x_{j-1}'.$$

11. A postcoder for use in a rotationally invariant trellis decoder comprising:

a first path having a plurality of exclusive OR gates for providing an output data stream $w_j'$ from a received precoded data stream $x_j'$ recovered using a sequence estimation algorithm;

a second path having a plurality of exclusive OR gates for providing an output data stream $z_j'$ from a received precoded data stream $y_j'$ recovered using said sequence estimation algorithm; and an AND gate having a first input coupled to receive the exclusive OR of the precoded data streams $x_j'$ and $y_j'$ from said first and second paths, respectively, and a second input coupled to receive the exclusive OR of delayed data streams $x_{j-1}'$ and $y_{j-1}'$ from said first and second paths, respectively, said AND gate having an output coupled to an input of one of the exclusive OR gates in said first path;

said postcoder producing said output data streams $w_j'$ and $z_j'$ from said precoded data streams $x_j'$ and $y_j'$ in accordance with the relationships:

$$w_j'=x_j'\oplus y_{j-1}'\oplus(x_j'\oplus y_j')\odot(x_{j-1}'\oplus y_{j-1}'),$$

and $$z_j'=y_j'\oplus x_j'\oplus y_{j-1}'\oplus x_{j-1}'.$$

12. A method for coding digital data to enable rotationally invariant trellis coded modulation thereof, comprising the steps of:

precoding a stream of bits to be coded to render them rotationally invariant when encoded with a transparent binary convolutional code and subsequently decoded and postcoded at a receiver;

encoding the precoded bits using said transparent binary convolutional code to provide coded information; and mapping the coded information to a two-dimensional signal space having a plurality of signal points, said points being labeled with unique binary codes in which the two least significant bits, denoted by $(I_j, Q_j)$, are permuted and partially complemented to $(\overline{Q}_j, I_j)$ for each 90° phase rotation around the signal space in a counter clockwise direction, the remaining most significant bits for each point, if any, being invariant to such rotation.

13. A method in accordance with claim 12 wherein said coded information is representative of in-phase (I) and quadrature phase (Q) data, said method comprising the further steps of:

transmitting the I and Q data over a communication channel in accordance with said signal space mapping;

receiving and demodulating the I and Q data from said communication channel;

decoding the coded information for the I and Q data to recover the precoded bits; and postcoding the recovered precoded bits to reverse the effect of said precoding step and recover said stream of bits.

14. A method in accordance with claim 12 comprising the further step of:

parsing said data prior to said precoding step into a stream of uncoded bits and said stream of bits to be coded;

wherein said uncoded bits are mapped to the most significant bits of signal points in said signal space and the coded information derived from said stream of bits to be coded is mapped to the least significant bits of said signal points.

15. A method in accordance with claim 14 wherein said uncoded bits and coded information are representative of in-phase (I) and quadrature phase (Q) data, said method comprising the further steps of:

transmitting the I and Q data over a communication channel in accordance with said signal space mapping;

receiving and demodulating the I and Q data from said communication channel;

pruning the demodulated I data to recover corresponding uncoded bits and coded information;

pruning the demodulated Q data to recover corresponding uncoded bits and coded information;

decoding the pruned coded information for the I and Q data to recover the precoded bits;

postcoding the recovered precoded bits to recover the stream of bits that was coded;

reencoding the recovered precoded bits using said transparent binary convolutional code to provide control signals; and selecting uncoded bits pruned from said I data or from said Q data in response to said control signals for combination with the stream of bits recovered by said postcoding step in order to reconstruct said digital data.

16. A rotationally invariant trellis coder for encoding input data to be transmitted to a receiver via a two-dimensional symbol modulation, comprising:

a precoder for processing said input data, said precoder comprising nonlinear logic that is the inverse of logic provided by a counterpart postcoder at said receiver;

an encoder for encoding the precoded data using a transparent binary convolutional code; and means for mapping the encoded data from said encoder to a two-dimensional signal space having a plurality of signal points, said points being labeled with unique binary codes in which the two least significant bits, denoted by $(I_j, Q_j)$, are permuted and partially complemented to $(\overline{Q}_j, I_j)$ for each 90° phase rotation around the signal space, the remaining most significant bits for each point, if any, being invariant to such rotation;

wherein said precoder converts a first input data stream $w_j$ and a second input data stream $z_j$ to corresponding precoded data streams $x_j$ and $y_j$, respectively, using feedback of delayed data $x_{j-1}$ and $y_{j-1}$ in accordance with the relationships:

$$x_j=w_j\oplus x_{j-1}\oplus z_j\odot(x_{j-1}\oplus y_{j-1}),$$

and $$y_j=z_j\oplus w_j\oplus y_{j-1}\oplus z_j\odot(x_{j-1}\oplus y_{j-1}).$$

17. A trellis coder in accordance with claim 16 wherein the $x_j$ and $y_j$ data streams output from said precoder are convolutionally encoded to provide the two least significant bits of symbols that are mapped to the signal points in said signal space.

18. An apparatus comprising a rotationally invariant trellis coder for encoding input data to be transmitted to a receiver via a two-dimensional symbol modulation, and a decoder for use in decoding symbols output from the trellis coder, said coder comprising:

a precoder for processing said input data, said precoder comprising nonlinear logic that is the inverse of logic provided by a counterpart postcoder at said receiver;

an encoder for encoding the precoded data using a transparent binary convolutional code; and means for mapping the encoded data from said encoder to a two-dimensional signal space having a plurality of signal points, said points being labeled with unique binary codes in which the two least significant bits, denoted by $(I_j, Q_j)$, are permuted and partially complemented to $(\overline{Q}_j, I_j)$ for each 90° phase rotation around the signal space, the remaining most significant bits for each point, if any, being invariant to such rotation;

said decoder comprising:

at least one sequence estimator for use in recovering said precoded data from a received data stream;

wherein said postcoder receives and processes the recovered precoded data to provide output data that is invariant to 90° rotations of the recovered precoded data.

19. An apparatus in accordance with claim 18 wherein said precoder converts a first input data stream $w_j$ and a second input data stream $z_j$ to corresponding precoded data streams $x_j$ and $y_j$, respectively, using feedback of delayed data $x_{j-1}$ and $y_{j-1}$ in accordance with the relationships:

$$x_j = w_j \oplus x_{j-1} \oplus z_j \odot (x_{j-1} \oplus y_{j-1}),$$

and $$y_j = z_j \oplus w_j \oplus y_{j-1} \oplus z_j \odot (x_{j-1} \oplus y_{j-1}).$$

20. An apparatus in accordance with claim 19 wherein the $x_j$ and $y_j$ data streams output from said precoder are convolutionally encoded to provide the two least significant bits of symbols that are mapped to the signal points in said signal space.

21. An apparatus in accordance with claim 18, said decoder further comprising:

means for pruning said received data stream to recover coded and uncoded bits therefrom, said coded bits being input to said sequence estimator;

means for selecting uncoded in-phase (I) data or uncoded quadrature phase (Q) data for combination with the output data from said postcoder; and means for reencoding the precoded data recovered by said sequence estimator for use in actuating said selecting means to select said uncoded I data or said uncoded Q data.

22. An apparatus in accordance with claim 18 wherein:

said precoder converts a first input data stream $w_j$ and a second input data stream $z_j$ to corresponding precoded data streams $x_j$ and $y_j$, respectively, using feedback of delayed data $x_{j-1}$ and $y_{j-1}$ in accordance with the relationships:

$$x_j = w_j \oplus x_{j-1} \oplus z_j \odot (x_{j-1} \oplus y_{j-1}),$$

and $$y_j = z_j \oplus w_j \oplus y_{j-1} \oplus z_j \odot (x_{j-1} \oplus y_{j-1});$$

and said postcoder converts the recovered precoded data comprising data streams $x_j'$ and $y_j'$ to first and second output data streams $w_j'$ and $z_j'$, respectively, in accordance with the relationships:

$$w_j' = x_j' \oplus y_{j-1}' \oplus (x_j' \oplus y_j') \odot (x_{j-1}' \oplus y_{j-1}'),$$

and $$z_j' = y_j' \oplus x_j' \oplus y_{j-1}' \oplus x_{j-1}'.$$

23. A decoder in accordance with claim 18, wherein said transparent binary convolutional code is a punctured code.

24. A method for coding digital data to enable rotationally invariant trellis coded modulation thereof, comprising the steps of:

precoding a stream of bits to be coded to render them rotationally invariant when encoded with a transparent binary convolutional code and subsequently decoded and postcoded at a receiver;

encoding the precoded bits using said transparent binary convolutional code to provide coded information; and mapping the coded information to a two-dimensional signal space having a plurality of signal points, said points being labeled with unique binary codes in which the two least significant bits, denoted by $(I_j, Q_j)$, are permuted and partially complemented to $(\bar{Q}_j, I_j)$ for each 90° phase rotation around the signal space, the remaining most significant bits for each point, if any, being invariant to such rotation; wherein:

said precoding converts a first input data stream $w_j$ and a second input data stream $z_j$ to corresponding precoded data streams $x_j$ and $y_j$, respectively, using feedback of delayed data $x_{j-1}$ and $y_{j-1}$ in accordance with the relationships:

$$x_j = w_j \oplus x_{j-1} \oplus z_j \odot (x_{j-1} \oplus y_{j-1}),$$

and $$y_j = z_j \oplus w_j \oplus y_{j-1} \oplus z_j \odot (x_{j-1} \oplus y_{j-1}).$$

25. A method in accordance with claim 24 wherein said coded information is representative of in-phase (I) and quadrature phase (Q) data, said method comprising the further steps of:

transmitting the I and Q data over a communication channel in accordance with said signal space mapping;

receiving and demodulating the I and Q data from said communication channel;

decoding the coded information for the I and Q data to recover the precoded bits; and postcoding the recovered precoded bits to reverse the effect of said precoding step and recover said stream of bits.

26. A method in accordance with claim 24 comprising the further step of:

parsing said data prior to said precoding step into a stream of uncoded bits and said stream of bits to be coded;

wherein said uncoded bits are mapped to the most significant bits of signal points in said signal space and the coded information derived from said stream of bits to be coded is mapped to the least significant bits of said signal points.

27. A method in accordance with claim 26 wherein said uncoded bits and coded information are representative of in-phase (I) and quadrature phase (Q) data, said method comprising the further steps of:

transmitting the I and Q data over a communication channel in accordance with said signal space mapping;

receiving and demodulating the I and Q data from said communication channel;

pruning the demodulated I data to recover corresponding uncoded bits and coded information;

pruning the demodulated Q data to recover corresponding uncoded bits and coded information;

decoding the pruned coded information for the I and Q data to recover the precoded bits;

postcoding the recovered precoded bits to recover the stream of bits that was coded;

reencoding the recovered precoded bits using said transparent binary convolutional code to provide control signals; and selecting uncoded bits pruned from said I data or from said Q data in response to said control signals for combination with the stream of bits recovered by said postcoding step in order to reconstruct said digital data.

* * * * *